Figure 1:
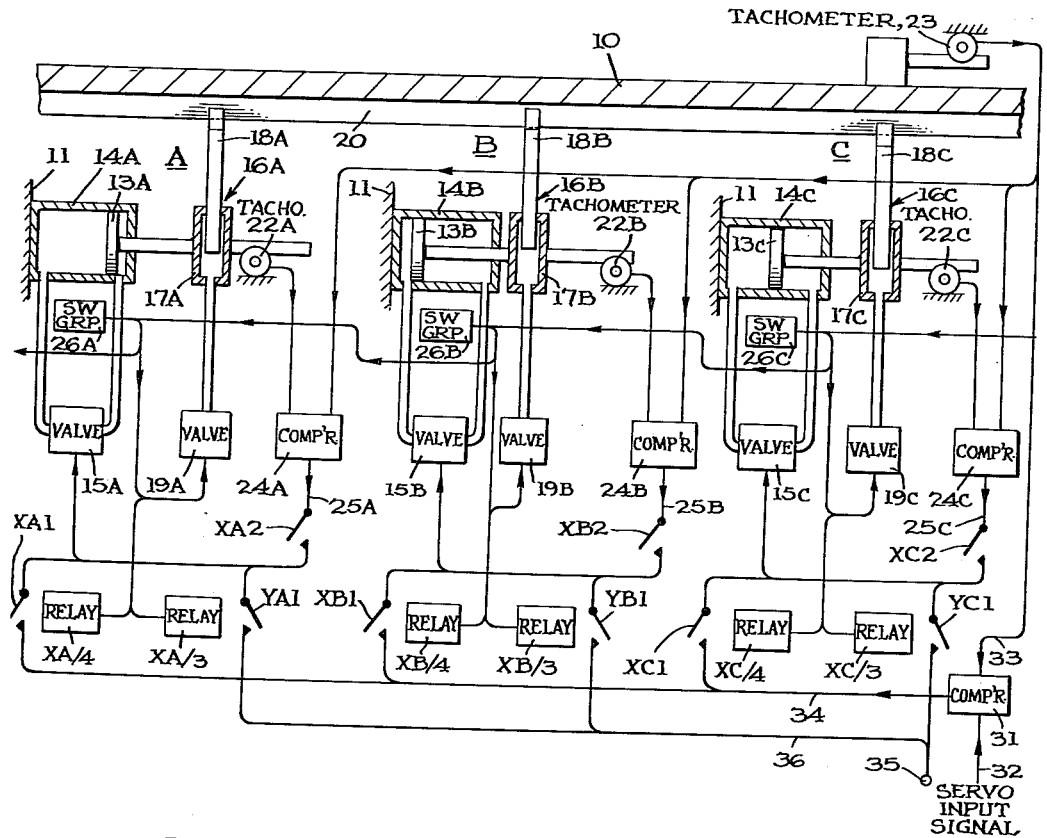

Aug. 28, 1962   R. S. J. GOOD ET AL   3,051,140
SERVO-CONTROLLED DRIVES
Filed Nov. 9, 1960
2 Sheets-Sheet 1

INVENTORS
RICHARD S. J. GOOD
DONALD F. WALKER
DAVID T. N. WILLIAMSON
BY Cameron, Kerkam & Sutton
ATTORNEYS

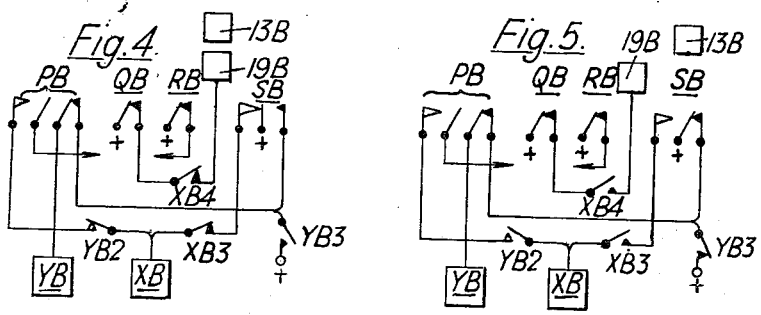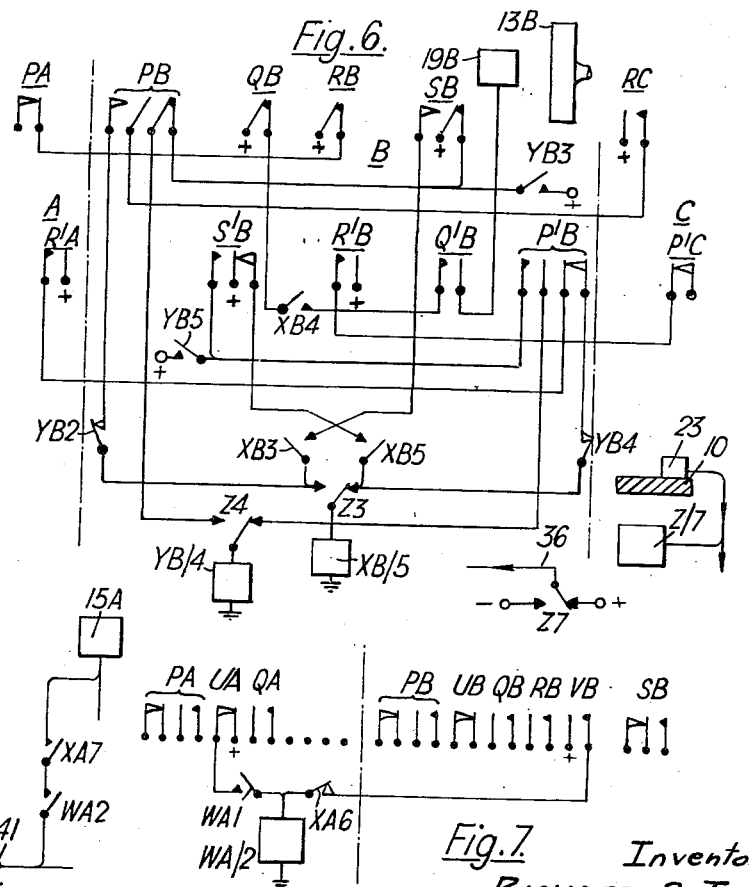

United States Patent Office 3,051,140
Patented Aug. 28, 1962

3,051,140
SERVO-CONTROLLED DRIVES
Richard Samuel Jonathan Good, Edinburgh, Donald Ferguson Walker, Barnton, Midlothian, and David Theodore Nelson Williamson, Priorwood Polton, Midlothian, Scotland, assignors to Ferranti, Limited, Hollinwood, England, a company of Great Britain and Northern Ireland
Filed Nov. 9, 1960, Ser. No. 68,251
Claims priority, application Great Britain Nov. 13, 1959
9 Claims. (Cl. 121—45)

This invention relates to servo-controlled drives for imparting to an object a movement with respect to a reference structure in dependence on a servo error signal. The invention has particular application to machine tools and will be described in that connection. It should however be understood that the invention is in no way restricted to machine tools but is suitable for any application where it is desired to move an object under the control of a servo signal.

In machine tool applications the object may be the worktable of the machine and the reference structure the fixed framework, the drive to the table being under the control of the servo signal. It will be assumed that the required movement of the table is a straightline movement; but the invention is also applicable to other forms of machine-tool movement, such as rotational movement.

It is known to effect such a drive by means of an actuator in the form of an electric motor operating to rotate a feedscrew to propel the table under the control of the signal. Such a system has the disadvantage of being somewhat slow in response to changes in the signal, or, if designed for a rapid response, of requiring expensive amplifier equipment. These defects become more marked as the power of the drive is increased.

It is also known to effect such a drive by means of a hydraulic actuator of the type including a piston arranged to traverse a cylinder under the control of the signal, such control operating by means of relative adjustments of the liquid pressures on the respective faces of the piston. The response is potentially very much more rapid than that of the inexpensive electric drive of the kind described but where a considerable movement of the worktable is required the arrangement is unwieldy and the speed of response is reduced owing to the elastic deformation of the necessarily long column of liquid unless expensive mechanical transmission systems are employed.

An object of the present invention is to provide a drive for the purpose stated capable of accurately effecting long movements of the object with a rapid response to changes of the error signal and without requiring expensive amplifying or transmission equipment.

A further object is to provide such a drive which combines some at least of the advantages of the short-range piston-and-cylinder type of actuator with a comparatively long range of overall movement.

In accordance with the present invention a servo-controlled drive for imparting to an object a movement with respect to a reference structure in dependence on an input signal representing at any given moment the required position, velocity, or acceleration of the object to the structure at that moment includes at least two hydraulic actuators each having a piston arranged to traverse a cylinder which is short compared with the range of said movement, for each actuator a clutch for coupling the actuator to drive the object relative to said structure, valve means whereby the position of the piston of the actuator in its cylinder is dependent on a valve control signal applied to said valve means, and a group of electrical switches arranged to be operated sequentially as the piston of the actuator makes each active stroke from a rest position, said drive also including a measuring device for deriving a measured signal representing at any given moment the actual position, velocity, or acceleration, as the case may be, of the object relative to said structure at that moment, a comparator for comparing said measured signal with said input signal and deriving an error signal dependent in sense on the sense of the difference between those signals, a relay system arranged to be controlled by said groups of switches so that the actuators, acting cyclically in sequence, effect by means of said switches the following operations successively: (1) cause the error signal to be applied as the said valve control signal to the valve means of an inactive one of said actuators so as to cause the piston to be driven from a rest position in the direction of said movement, (2) after that piston has attained the speed of said movement, cause the clutch of that actuator to be engaged, thereby rendering the actuator active, (3) apply a start signal to the next oncoming actuator, (4) cause the clutch of the first-mentioned actuator to be disengaged, thereby rendering the actuator inactive, and (5) cause a restoration signal to be applied as the said valve control signal to the valve means of the first-mentioned actuator to cause its piston to be restored to its rest position, the said application of said start signal being such as to initiate said operations (1) to (5) as regards said oncoming actuator, said switches being so operated that the clutch of an actuator is not disengaged in accordance with operation (4) until the clutch of the next oncoming actuator has been engaged in accordance with operation (2).

In the accompanying drawings:
FIGURE 1 is a schematic diagram of one embodiment of the invention,
FIGURE 2 is a sectional view to an enlarged scale of a part of the apparatus of FIGURE 1,
FIGURE 3 is a circuit diagram of another part of the apparatus of FIGURE 1,
FIGURES 4 and 5 show the apparatus of FIGURE 3 in operation, and
FIGURES 6 and 7 are circuit diagrams similar to that of FIGURE 3 but modified in accordance with further embodiments.

Figure 3:
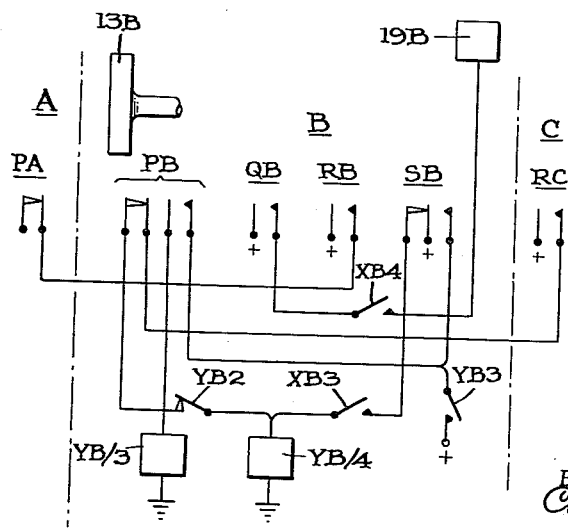
Figure 2:
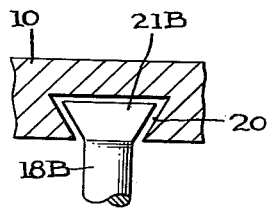

In carrying out the invention in accordance with one form by way of example, see FIGURES 1 to 3, a servo-controlled drive for moving the worktable 10 of a machine tool from left to right (as viewed in FIG. 1) in the direction of the plane of the paper at a velocity dependent on an input signal from a computer includes three identical short-range actuators A, B, and C, of high accuracy secured to the framework 11 of the tool.

Actuator B includes a piston 13B arranged to traverse a cylinder 14B under the conrtol of valve means in the form of a fluid-flow valve 15B which itself is controlled by electrical valve control signals in a manner to be described. The valve is such that when the control signal is of one sense—positive, say—the piston is driven to the right, and when the signal is of the other sense (negative) the piston is driven to the left.

Piston 13B is coupled to the table 10 by way of a clutch 16B. This consists of a cylinder 17B connected rigidly to piston 13B so that the axes of the two cylinders 14B and 17B are at right angles, and a plunger 18B the position of which is determined by another electrically controlled fluid-flow valve 19B. The free end of the plunger lies in a long slot 20; this is shown in enlarged section in FIG. 2, the direction of movement of table 10 being here supposed to be normal to the plane of the paper. The slot is of dovetail shape and plunger 18B ends in a member 21B of complementary shape—that is, the shape of a truncated wedge. Thus a downward movement of the plunger under the control of valve 19B causes member 21B to engage the slot frictionally, thereby engaging the clutch to couple actuator B to the table relative to framework 11, whereas an upward movement disengages member 21B and so releases the clutch.

Coupled to clutch 16B or to the piston rod of the actuator is a pick-off device 22B, such as a tachometer, designed to produce a direct-current (D.C.) output signal of magnitude dependent on the velocity of piston 13B relative to its cylinder and of sense dependent on the direction of the piston's movement. A similar pick-off device 23 is coupled to the worktable to provide a D.C. output dependent on the velocity and direction of the table's movement, this component constituting a measuring device for deriving a measured signal (the D.C. output) representing at any given moment the actual velocity of the table relative to the framework at that moment. The two signals are compared in a comparator 24B which delivers over an output lead 25B a D.C. signal dependent on the sense and magnitude of the difference between the applied signals and hence dependent on the difference between the velocities of piston 13B and the worktable.

A signal for controlling the actuators is derived by a comparator 31 as an error signal from comparison with, on the one hand, a servo input signal delivered over a channel 32 from a computer (not shown) to represent at any given moment the required velocity of the worktable with respect to the frame at that moment, and, on the other hand, the output signal from pick-off 23, delivered over a channel 33, which represents the actual value of the table velocity at that moment. This error signal, delivered over a lead 34 in the form of a potential of appropriate sense and value, is applied to valve 15B by way of make relay contacts XB1 of a relay XB/4.

Valve 15B is also controllable by a further valve control signal constituted by the output of comparator 24B, applied over lead 25B by way of further make contacts XB2 of the relay, and by a restoration signal supplied by a source 35 of negative polarity applied by way of a lead 36 and make contacts YB1 of a relay YB/3.

Relays XB and YB, together with the clutch-control valve 19B, are controlled by a group of switches shown generally at 26B.

Actuators A and C are also provided with components 13A, 14A, etc., 13C, 14C, etc., respectively, similar to those so far designated by a reference including the letter B.

The individual switches of switch group 26B are arranged to be operated sequentially as the piston 13B traverses its cylinder. For clarity, these switches are depicted to be an enlarged scale in FIG. 3, where it is assumed again that the active stroke is always from left to right and the return, inactive stroke from right to left.

The switches operated in order as the piston performs its active stroke are designated PB, QB, RB, and SB. In depicting and referring to these switches they will for convenience be considered as if controlled by relays which operate sequentially as the piston makes its active stroke from left to right and restore in reverse order as the idle piston returns inactively to its rest position. In accordance with conventional relay terminology, therefore, each pair of contacts that are closed when the piston is on the left of the position concerned and are broken as the piston moves past from left to right on its active sroke will be referred to as break contacts, the fixed one of them being depicted unshaded, and each pair of contacts that are open when the piston is on the left of the position concerned and are closed as the piston moves past on its active stroke will be referred to as make contacts, the fixed one being depicted shaded. In FIG. 3 the switches are shown for the condition when the piston is at its rest position preparatory to making its next active stroke; hence all the break contacts are shown closed and the make contacts shown open.

Though for convenience the operation will be described as if the switches were located in the cylinder 14B and the piston operated each in turn on reaching the appropriate point on its stroke, it will be appreciated that the switches need not necessarily be operated by the piston itself but are more conveniently located outside the cylinder, perhaps arranged in a circular bank, and controlled by some sort of linkage (not shown), coupled to the piston rod or the clutch, so that each switch is operated as the piston reaches the appropriate point on its stroke.

The moving contacts of switches QB, RB, and SB are connected to a source of positive potential. Their fixed contacts and the contacts of switch PB are connected to one another and to relays XB and YB as follows.

PB, break contacts: between the fixed contact of switch RC (of actuator C, corresponding to switch RB of actuator B) and earth by way of break contacts $YB_2$ of relay YB and the energising winding of relay XB.

PB, make contacts: between the fixed make contact of switch SB and earth by way of the energising winding of relay YB.

QB, fixed contact: by way of make contacts XB4 of relay XB to clutch-control valve 19B.

RB, fixed contact: to break contacts PA of actuator A (corresponding to break contacts PB of actuator B).

SB, break fixed contact: to relay XB by way of make contacts XB3 of that relay (to act as a locking circuit).

SB, make fixed contact: connected to PB make contacts (see above); also to positive source through make contacts YB3 of relay YB.

Exactly similar relay systems (not shown) are provided for actuators A and C, to control their respective piston movements by means of their X and Y relays.

In the condition depicted in FIG. 3, with piston 13B in its rest position preparatory to making an active stroke, and with contacts RC open (on the assumption that piston 13C of actuator C is on an active stroke under the control of the error signal but has not yet reached these contacts) it will be seen that neither of the relays XB and YB is energised, the circuit of relay XB being broken at contacts RC and XB3 and that of relay YB being broken at contacts PB (make), SB (make), and YB3. Hence the control circuit of actuator-control valve 15B are broken at contacts XB1, YB1, and XB2, and that of clutch control valve 19B at contacts QB and XB4. Thus actuator B is inactive with its clutch disengaged.

The operation of the equipment will now be described from the moment when the piston of actuator C reaches and closes switch RC.

The closing of these contacts applies a start signal to actuator B by causing relay XB to be energised by way of closed break contacts PB and YB2. The relay operates, closing all its four contacts XB1 to XB4.

The closing of contacts XB1 (see FIG. 1) causes the error signal on lead 34 to be applied as the valve control signal to valve 15B, thereby starting the piston 13B on its rightward movement.

By way of contacts XB2 (FIG. 1) the output from comparator 24b is also connected to valve 15B, to apply as a further valve control signal a voltage to the valve which being proportional to the difference between the velocities of the table and the piston acts as a starting boost to the piston.

Contacts XB3 (FIG. 3) complete the locking circuit of the relay through break contacts SB.

Contacts XB4 prepare, but do not complete, the energising circuit of clutch-control valve 19B.

The movement of the piston operates switches PB to SB in turn. The first operation opens the PB break contacts and closes the make contacts, which events may occur simultaneously.

The opening of these break contacts interrupts the closing circuit of relay XB but leaves the relay still energised by its locking circuit. These contacts are provided to prevent relay XB from receiving the starting signal from actuator C unless piston 13B is at its rest position.

The closing of the PB make contacts prepares but does not complete the energising circuit of relay YB.

As it continues its rightward movement the piston gathers speed, the boost from comparator 24B falling off proportionately. The distance the piston has to travel before the next switch, QB, is operated is such that the piston has by then attained the speed of movement of the table, as demanded by the error signal. The conditions are therefore ready for the clutch 16B to be engaged, and this is effected by the closing of contacts QB to complete the energising circuit of the clutch-control valve 19B.

Actuator B is now on the active part of its stroke, sharing with actuator C the moving of the worktable. By this time the next oncoming actuator, actuator A, is inactive with its piston at the rest position. When piston 13B reaches and closes contacts RB it thereby sends a start signal to actuator A, by energising its XA relay (FIG. 1) through its closed break contacts PA and so causing the error signal to be applied as the valve control signal to the valve means 15A of that actuator. Actuator A is thus started on its rightward stroke in an exactly similar manner to that in which actuator B was started by a signal from actuator C.

The conditions of the respective switches of group 26B is now as shown in FIG. 4.

When the piston reaches switch SB the opening of the break contacts allows relay XB to restore and open all its contacts XB1 to XB4. Two results follow: the opening of contacts XB1 removes the error signal from its control of valve 15B, and the opening of contacts XB4 breaks the energising circuit of valve 19B and so causes the clutch to be disengaged. The overall result is to render actuator B inactive.

It is now necessary to restore the idle piston 13B to its rest position at the other end of the cylinder. This is effected by the closing of the make contacts of switch SB, which completes the energising circuit of relay YB through the closed make contacts of switch PB (see FIG. 5).

Relay YB, in operating, closes its make contacts YB1 thereby applying as the valve control signal to valve 15B a restoration signal in the form of the negative potential of source 35 by way of lead 36 and so initiates the leftward movement of the piston. By closing its contacts YB3 (see FIG. 5) the relay completes its locking circuit so that the relay remains operated despite the re-opening of the SB make contacts as the piston moves past on its return stroke, restoring the switches sequentially in reverse order. The re-closing of the SB break contacts has no effect, as the XB3 contacts are open; relay XB therefore remains unenergised. The re-opening of contacts R has no effect on actuator A because relay XA has locked itself on. The re-opening of contacts Q also has no effect, as the clutch-energising circuit has already been broken at contacts XB4. The re-opening of the PB make contacts allows relay YB to restore, thereby opening contacts YB1 to remove the restoration signal from valve 15B and so cause piston 13B to stop at its rest position at the left hand end of the cylinder. Simultaneously the closing of the YB2 and PB break contacts prepares the energising circuit of relay XB for the next starting signal from actuator C.

Actuators A and C are each provided with a like relay system to that shown in FIG. 3, which operates in a similar manner. Switch RA (not shown) of actuator A applies the starting signal to relay XC of actuator C, so that the three actuators operate repetitively in sequence in what might be described as a continuous ring cycle. The extents to which the active strokes of the three actuators overlap are controlled by the spacing, relative to the length of the stroke, of the Q and S switches of each actuator, which determines the relative duration of the active part of the stroke, and the position of the R switch, which determines the starting time of the next oncoming actuator. It is preferable to space these switches so that there are never less than two actuators active at any given moment; this means in practice that there is a short interval between the rendering active of the next incoming actuator and the rendering idle of the next off-going one during which all three actuators are active together. Usually switches R and S are spaced more widely apart relative to the other switches than is shown in FIG. 3, so as to give the oncoming actuator enough time to reach the driving speed before the off-going one is disengaged.

Where the worktable is to be moved in the reverse direction and accordingly each active stroke is from right to left, instead of from left to right as just described, it is necessary to reverse the sequence of the switches P to S and the polarity of the signals applied to the actuator-control valves 15; otherwise the operation is as before.

In order that the table may be driven in either direction by an error signal which varies in sense, the embodiment of FIG. 3 may be modified as shown in FIG. 6.

The original switches PB to SB are indicated as before but with their contacts in the condition appropriate to the piston 13B being at the right-hand end of its stroke. Exact counterpart switches P¹B to S¹B are provided to control the relay system when the active stroke is from right to left. These switches are accordingly in reverse sequence to that of the original ones. Following the above-mentioned convention, the contacts of these additional switches are shown and will be referred to as break contacts if they are opened during the active right-to-left stroke, and as make contacts if they are closed during it; they also are depicted as if the piston were at the right-hand end of its stroke; hence the break contacts of these additional switches are shown closed and the make contacts shown open.

It will be seen from a study of FIG. 6 that whatever the direction of the active stroke, the above convention as regards the switch contacts will not hold good for one set of switches—e.g. the switches PB to SB for a right-to-left drive—since what are termed and shown as the break and the make contacts are respectively made and broken during the active stroke. But as will be made clear later this set of switches has no control of the relay system when the active strokes are in that direction, neither during each active stroke itself nor during the idle return stroke, and so can be disregarded. The convention always holds for the set of switches which does control the relay system.

The additional set of switches P¹B to S¹B are shown on a lower line from the original set, but this is merely to clarify the drawing. The effective positions along the stroke relative to the positions of the original switches may be roughly as depicted—that is, the new switches are in the same positions relative to the mid point of the stroke as are the original ones, but reversed in direction.

Connected to pick-off 23 is a relay Z/7 common to all three actuators and arranged to control changeover switches Z1 to Z7 in dependence on the direction of the table movement. Only switches Z3, Z4, and Z7 are shown, the other four acting for actuators A and C in a manner which will be indicated later. It is assumed for convenience that when the error signal is positive the direction of the drive is from left to right as before and the moving contacts of the Z switches engage their left-hand fixed contacts, and that when the error signal is negative and in consequence the drive is in the reverse direction the moving contacts of the Z switches engage their right-hand fixed contacts. FIG. 6 depicts the relay system as set for the latter conditions.

Relay YB is provided with additional break contacts YB4 and make contacts YB5, and relay XB with additional make contacts XB5.

The moving contact of switch Z3 is connected to the energising winding of relay XB, the other end of which is earthed as before. The left-hand fixed contact is connected through contacts YB2 to the PB break contacts and through locking contacts XB3 to the SB break contacts. The right-hand fixed contact is connected through the additional break contacts YB4 of relay YB to the fixed break contact of the added switch $P^1B$. The moving break contact of switch $P^1B$ is connected to the fixed make contact of switch $R^1A$ added to actuator A. This right-hand fixed contact of switch Z3 is also connected through the additional make contacts XB5 of relay XB to the fixed break contact of added switch $S^1B$, the moving contact of which is connected to the positive source.

The moving contact of switch Z4 is connected to earth through the energising winding of the Y relay. Its left-hand fixed contact is connected to the make contacts of switch PB, which contacts are connected to switch SB and locking contacts YB3 as before. The right-hand fixed contact of switch Z4 is connected through the make contacts of switch $P^1B$ to switch $S^1B$ and the additional locking contacts YB5 in a similar manner.

Switch QB is connected to contacts XB4 as before, but the continuation of this circuit to valve 19B is now by way of the added switch $Q^1B$.

The fixed contact of switch $R^1B$ is connected to the moving contact of switch $P^1C$ added to actuator C.

Switches Z1 and Z2 (not shown) are arranged to control relays XA and YA, respectively, of actuator A, and switches Z5 and Z6 (not shown) to control relays XC and YC, in a similar manner.

The moving contact of switch Z7 is connected to lead 36 and the left and right fixed contacts to sources of negative and positive polarity respectively. On the above assumption that the error signal, at the moment, is negative, the positively energised one of these fixed contacts is the one shown engaged.

From FIG. 6 it will be realised that when the drive is from left to right and accordingly all the Z switches are engaging their left-hand contacts (rather than the right-hand ones, as depicted) the conditions as regards the original switches PB and SB are the same as described with reference to FIG. 3, the additional switches $P^1B$ and $S^1B$ being ineffective, whatever their conditions, since they are isolated from the relays by the disengagement of the right-hand fixed contacts of switches Z3 and Z4. Of the other added switches, neither the closing nor the opening of contacts $R^1B$ has any effect on actuator C, since the connection to relay XC is broken at the right-hand fixed contact of changeover switch Z5 (not shown, but corresponding to switch Z3) of that actuator. Nor has the added switch $Q^1B$ any effect on the control of the clutch, for during the first part of the active (left-to-right) stroke these contacts are closed, leaving the clutch to be actuated by switch QB as before, and by the time the piston has reached and opened these contacts the clutch has already been disengaged through the restoration of relay XB by switch SB. On the return, idle, stroke from right-to-left the closing of contacts QB has again no effect as the clutch circuit remains broken at contacts XB4.

Assume now that just as the piston reaches the right-hand end of its active left-to-right stroke the error signal changes to negative, reversing the direction of the drive and so causing the Z relay to reverse its switches to the positions shown. The further operation is very similar to that already described, except that switches $P^1B$ to $S^1B$ are in effective operation in place of the now ineffective switches PB to SB, the start signal comes from actuator A (by the closing of contacts $R^1A$ of that actuator) instead of from actuator C, and the active stroke is now from right to left.

In brief: the start signal from contacts $R^1A$ of actuator A reaches relay XB by way of the closed break contacts $P^1B$ and YB4 and the right-hand fixed contact of switch Z3. Relay XB locks itself on through contacts XB5 and break contacts $S^1B$, and the stroke of the actuator is initiated by the closing of contacts XB1 as before. When the piston reaches switch $Q^1B$ the clutch is operated, the other contacts XB4 and QB of its energising circuit being already closed. The closing of contacts $R^1B$ sends the start signal to actuator C.

The rest of the operation is sufficiently similar to that of the left-to-right drive, with the appropriate switches and contacts changed over, as not to need description, except to note that the closing of contacts RB during the inactive return stroke from left to right has no effect on actuator A, since that actuator is then active and in consequence the circuit between contacts RB and relay XA is broken at break contacts PA (see FIG. 3).

The lead to clutch-control valve 19B may alternatively be taken from the moving contact of switch QB, the energising source being transferred to the moving contacts of switch $Q^1B$. The condition for the clutch circuit to be closed is that both these switches are closed and relay XB is operated, and this only occurs when piston 13B is between the two switches on its active stroke, whether that stroke is from left to right or from right to left. Whenever the piston is between these switches on its return inactive stroke both switches are closed as before but the clutch circuit is broken at the now open contacts XB4.

Whenever the error signal changes sign in operation, of course, there will be at least two actuators engaged on their active strokes. The reversal of their direction is automatically effected by the change of sign in the error signal, acting on the valves 15, the changeover of the Z contacts, resulting from the change in direction of the drive, bringing into effective service the set of actuator switches appropriate to the new direction. In an actuator at rest when the sense changes, the necessary transfer of its piston to the new rest position at the other end of its stroke is also automatically effected. This will be appreciated from FIG. 6 if it is assumed that the error signal becomes positive, since the changeover to its left fixed contact of switch Z4 causes relay YB to be energised by way of the closed make contacts PB and SB, with the result that the piston is transferred idly back from its previous rest position on the right to its new one on the left.

In all the above embodiments the actuators continue to be brought into action sequentially and repetitively, driving the table at the speed and in the direction demanded by the error signal. The fact that the drive, however long, is being effected throughout by short-range actuators gives the advantages of precision operation, extremely rapid response, and negligible backlash usually associated only with an overall drive of short range or with elaborate and costly equipment.

In certain applications where a high-speed drive is required it may be found that the oncoming actuator receives the starting signal before its idle piston has been fully transferred to the appropriate rest position from its previous active stroke. In such a case the X relay is operated late, and in consequence the subsequent piston movement in the driving direction may lag sufficiently for the actuator to lose station gradually over the subsequent cycles of operation—and similarly delay the following actuator—with the result that the drive becomes uneven. To guard against such possible misoperation the additional equipment shown in FIG. 7 for supplying a supplementary starting boost may be provided. To simplify the description the equipment is shown as added to that of FIG. 3, where only a left-to-right drive is required; but as will be explained later the equipment, extended to cover drives in the other direction as well, is equally applicable to the arrangement of FIGURE 6.

Each actuator switch group is provided with an additional break switch U between switches P and Q and an additional make switch V between switches R and S, the positive source being connected to the moving contact of each. Actuator A is provided with a booster relay WA/2 and its X relay is provided with additional break contacts XA6 and make contacts XA7. To the energising circuit of relay WA is connected the fixed contact of switch VB by way of the additional break contacts XA6 of relay XA. A locking circuit for relay WA is provided from the fixed contact of switch UA by way of make contacts WA1 of relay WA. In actuator A a source 41 of positive booster voltage, common to all three actuators, is connected to valve 15A by way of make contacts WA2 and XA7 of the corresponding relays.

In operation, where piston 13A is being restored to its rest position in time for the next active stroke, the closing of contacts VB has no effect, for by then piston 13A will already have received whilst in its rest position the starting signal from contacts RB, with the result that relay XA will have operated and the circuit from contacts VB will be broken at the open break contacts XA6. But should piston 13A not have been fully restored when contacts VB close, the starting signal from contacts RB will be blocked at the open break contacts PA, so that relay XA will not have operated and contacts XA6 will be closed. In such circumstances relay WA becomes energised from switch VB through the closed XA6 contacts. Being thus operated, relay WA locks itself on through contacts WA1 and UA. Contacts WA2 are also closed, but this does not have an immediate effect as contacts XA7 are open because relay XA has not yet operated. When eventually relay XA does operate, the closing of contacts XA7 completes the booster circuit from source 41 to valve 15A, which causes the drive in the active direction to be accelerated sufficiently to make up for the time lost before the oncoming piston 13A has opened contacts UA to remove the boost. The opening of these contacts breaks the circuit of relay WA, and as the energising circuit of this relay is already broken through the opening of contacts XA6 when relay XA at length operated, the relay is restored and opens its contacts WA1 and WA2. Piston 13A thereafter continues its movement under control of the main signal and the boost from comparator 24A only, and acquires the demanded speed before it closes switch QA to engage the clutch.

Each of the other actuators is provided with a similar relay WB or WC, as the case may be, similarly arranged to be energised by switches VC and VA (not shown) respectively to apply a supplementary boost from source 41 to valve 15B or 15C, as the case may be, in like circumstances.

The application of this supplementary boost equipment to the equipment of FIG. 6 for drives in either direction merely requires the provision of U and V switches for the right to left drives as well, with interconnection suitably controllable by further changeover switches of relay Z to bring into use whichever of the U and V switches are appropriate to the then sense of the error signal.

It is usually desirable when this supplementary boost is applied, to withdraw from the actuator concerned the main boost applied from comparator 24. This may be very simply effected by providing in the common lead from source 41 a relay which is accordingly operated whenever the supplementary boost is applied to any actuator and when so operated opens contacts in each lead 25 between the comparator 24 and valve 15 of that actuator. This will break the main booster circuit of the other two actuators as well as that of the delayed oncoming one, but as both these actuators will of necessity be active, their main booster circuits will be already inoperative since the outputs from their comparators 24 will be zero.

Where the input signal represents the required position of the table rather than its required velocity it is necessary for pick-off 23 to provide two outputs, one proportional to the displacement of the table, for application to comparator 31, and the other proportional (as before) to table velocity, for application to comparators 24.

A convenient form of pick-off for this purpose combines a potentiometer to supply the displacement signal and a tachometer to supply the velocity signal. To control relay Z in dependence on the direction of the drive, the tachometer should conveniently be of the kind providing an output voltage which varies in sense with the direction of drive. This output is applied to switch Z, preferably by way of some form of trigger circuit.

In any of the above embodiments which permit of table reversal, relay Z may alternatively be controlled in dependence on the sense of the error signal rather than on the direction of table movement. It is however usually preferable to control this relay in dependence on the direction of the drive, since the error signal may be subject to transient reversals due to the overrunning of the table on account of its inertia, and it is of course undesirable for relay Z to respond to such changes.

Where the drive is shared, as is usually the case, by two or more actuators, the situation may arise where the actuator about to come off is bearing more than its share of the load. The de-clutching of that actuator may therefore cause a transient disturbance to the system. This misoperation may be avoided by causing each actuator to disengage gradually, such as by slightly slipping its clutch.

It will of course be appreciated that where throughout this specification and claims the movement of a piston— for example its stroke—is referred to, the meaning to be understood is the movement of the piston relative to the cylinder, so that in fact the piston itself may be stationary, the movement which imparts the drive being that of the cylinder; for example, the piston may be secured to the fixed reference structure and the cylinder to the moving worktable. It will also be understood that the term "kinetic relationship of the object to the structure" as used in the appended claims is intended to mean either the position, the velocity, or the acceleration of the object relative to the structure.

What we claim is:

1. A servo-controlled drive for imparting to an object a movement with respect to a reference structure in dependence on an input signal representing at any given moment a required kinetic relationship of the object to the structure at that given moment including: (a) at least two hydraulic actuators each having a piston arranged to traverse a cylinder which is short compared with the range of said movement, (b) for each actuator a clutch for coupling said actuator to drive the object relative to said structure, valve means whereby the position of the piston of said actuator in its cylinder is dependent on a valve control signal applied to said valve means, and a group of electrical switches arranged to be operated sequentially as the piston of said actuator makes each active stroke from a rest position, said drive also including (c) a measuring device for deriving a measured signal representing at any given moment the actual kinetic relationship of the object to said structure at said given moment, (d) a comparator for comparing said measured signal with said input signal and deriving an error signal dependent in sense on the sense of the difference between those signals, and (e) a relay system arranged to be controlled by said groups of switches so that the actuators, acting cyclically in sequence, effect by means of said switches the following operations successively: (1) cause the error signal to be applied as the said valve control signal to the valve means of an inactive one of said actuators so as to cause its piston to be driven from a rest position in the direction of said movement, (2) after said piston has attained the speed of said movement, cause the clutch of said inactive actuator to be engaged, thereby rendering said actuator active, (3) apply a start signal to the next oncoming actuator, (4) cause the clutch of the first-mentioned actuator to be disengaged, thereby rendering said first-mentioned actuator inactive, and (5) cause a restoration signal to be applied in place of said error signal as the said valve control signal to the valve means of the first-mentioned actuator to cause its piston to be restored to its rest position, the said application of the start signal being such as to initiate operations (1) to (5) as regards said oncoming actuator, said switches being so operated that the clutch of an active actuator is not disengaged in accordance with operation (4) until the clutch of the next oncoming actuator has been engaged in accordance with operation (2).

2. Apparatus as claimed in claim 1 wherein said relay system includes for each actuator a first relay arranged to be so controlled by said switches as to be energised from the instant of receipt of the start signal applied to said actuator in accordance with said operation (3) to the end of the ensuing active stroke of said actuator, and which first relay when so energised applies the error signal continuously to the valve means of said actuator.

3. Apparatus as claimed in claim 2 wherein said first relay when energised also completes a locking circuit for itself by way of break contacts of the said group of switches of said actuator, these contacts being located so as to be opened at the end of each active stroke of said actuator and so as to be closed during the subsequent inactive stroke, and prepares a clutch energising circuit arranged to be completed to effect operation (2) by make contacts of said groups of switches during each stroke of said actuator in the active direction, whereby operation (4) is effected by the interruption of said clutch energising circuit resulting from said restoration of the first relay caused by the interruption of its locking circuit by said break contacts.

4. Apparatus as claimed in claim 2 wherein the said relay system also includes for each actuator a second relay arranged to be so controlled by said group of switches of said actuator as to be energised throughout each inactive stroke of said actuator and which second relay whilst so energised applies the restoration signal continuously to the valve means of said actuator to effect operation (5).

5. Apparatus as claimed in claim 4 wherein said second relay when energised also completes a locking circuit for itself by way of make contacts of the said switches of said actuator, said make contacts being located so as to be closed near the beginning of the stroke of said actuator in the active direction and opened at the end of the subsequent inactive stroke, said second relay being connected for energisation by make contacts of said group of switches located so as to be closed at the end of the active stroke and opened at the beginning of the subsequent inactive stroke.

6. Apparatus as claimed in claim 4 where the error signal is subject to changes of sense requiring corresponding changes in the direction of movement of the object including for each actuator a further group of electrical switches similar to said first-mentioned group and arranged to be operated sequentially as the piston of said actuator makes each active stroke in the opposite direction to said first-mentioned active stroke, there being further provided changeover means responsive to the sense of the error signal for connecting to said first and said second relays the one of said groups of switches appropriate to that sense.

7. Apparatus as claimed in claim 2 wherein to apply a supplementary starting boost to each oncoming actuator there is provided for each actuator a booster relay arranged to be so controlled by said switches as to be energised immediately subsequent to the application to said actuator of the start signal whenever the piston of said actuator is not in its rest position and to be restored prior to the engagement of the clutch of said actuator, and which booster relay when so energised applies a supplementary valve control signal to the valve means of said actuator when the first relay thereof has become energised.

8. Apparatus as claimed in claim 7 wherein said booster relay when energised also completes a locking circuit for itself by way of break contacts of the said group of switches of said actuator, said contacts being located so as to be opened prior to the engagement of the clutch of said actuator, said booster relay being connected for energisation by way of break contacts of said first relay in series with make contacts of the group of switches of the actuator which applies the start signal to the first-mentioned actuator, said make contacts being located so as to be closed after each application of said start signal and opened during the subsequent inactive stroke of the second-mentioned actuator.

9. Apparatus as claimed in claim 2 wherein to apply a starting boost to each oncoming actuator there is provided a pick-off for deriving an object-velocity signal representing at any given moment the velocity of said object at that moment, and for each actuator a pick-off device for deriving a piston-velocity signal representing at any given moment the velocity of the piston of said actuator at that moment, a comparator for comparing said velocity signals and deriving a further error signal dependent in sense and magnitude on the sense and magnitude of the difference between said signals, and means for applying said further error signal in addition to the first-mentioned error signal to the valve means of each actuator during the energisation of the first relay of said actuator.

References Cited in the file of this patent

UNITED STATES PATENTS

| | | |
|---|---|---|
| 2,467,740 | Haller | Apr. 19, 1949 |
| 2,657,046 | Tallis | Oct. 27, 1953 |